May 10, 1938. T. EARLE 2,116,511
PAPER STOCK DEINKING METHOD
Filed Dec. 22, 1934
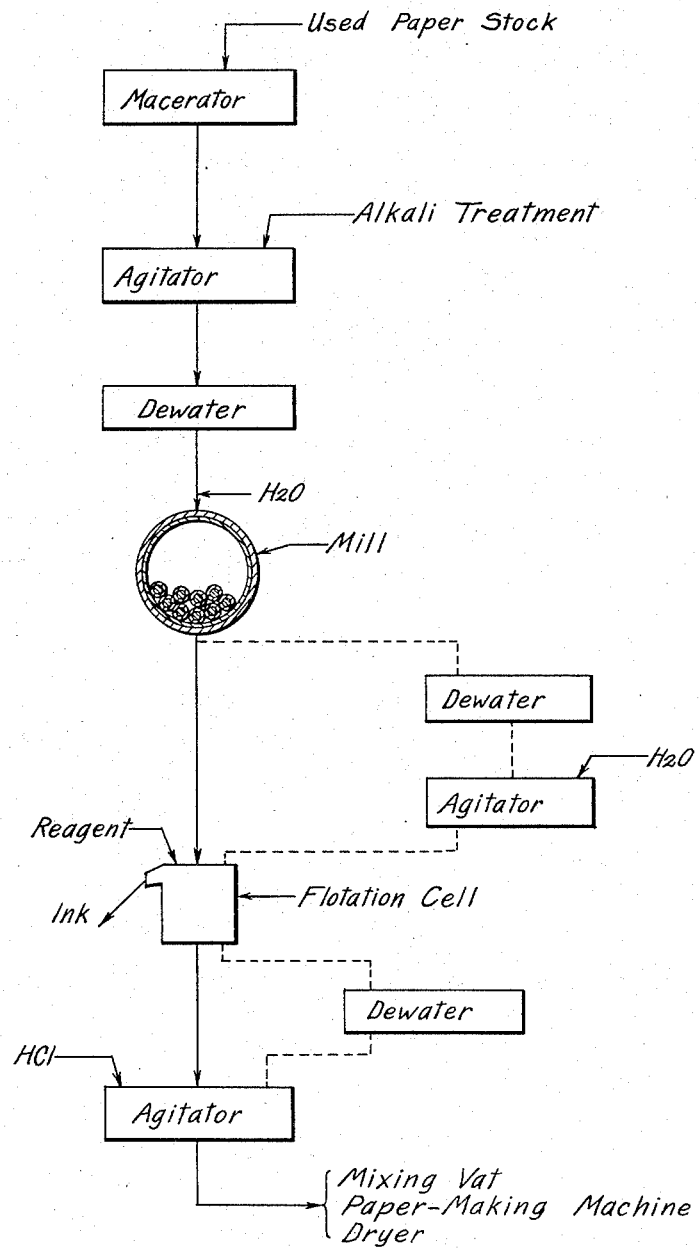
INVENTOR
Theodore Earle,
BY *Homer S. Sweet*
ATTORNEY Patented May 10, 1938

2,116,511

UNITED STATES PATENT OFFICE 2,116,511

PAPER STOCK DEINKING METHOD

Theodore Earle, Denver, Colo.

Application December 22, 1934, Serial No. 758,829

11 Claims. (Cl. 92—13)

This invention relates to paper and the art of paper making, and more particularly to the salvaging of used paper and the treatment and preparation of such used paper to recover the essential fiber thereof for reuse in the manufacture of paper, and has as an object to provide an improved method for cleansing and purifying used paper.

A further object of the invention is to provide an improved method efficiently operable to deink newsprint and other printed used paper.

A further object of the invention is to provide an improved step in a deinking method efficiently operable to detach ink from the essential fiber of used paper.

A further object of the invention is to provide an improved step in a deinking method efficiently operable to separate ink from the essential fiber of used paper.

A further object of the invention is to provide an improved paper-deinking method that is relatively simple and inexpensive of operation and efficiently productive of recovered paper stock of substantially original quality and color.

My invention consists in the nature, sequence and combination of steps hereinafter set forth, more specifically pointed out in my claims and graphically illustrated by the diagrammatic flow sheet shown in the accompanying drawing, in which—the figure is a diagram of a general arrangement of conventional apparatus through which the improved method may be made practically effective.

Paper manufacture, as at present practiced, does not damage or alter the character of the essential fiber from which the paper is originally made, hence such fiber may be recovered from used paper and reused, time after time, in the manufacture of fresh paper stock, as is well known, and various methods for such recovery of paper stock fiber have heretofore come into general use. The limitations in respect of practical recovery of fiber from used paper are to be found in the d'fficulty and consequent expense of thoroughly deinking printed paper stock, methods heretofore operable to restore the original quality and color of the used fiber having proved too expensive for practical employment and the economically practical methods failing to thoroughly deink the used stock and hence being productive of a recovered fiber inferior in respect of color and consequently not salable at the price and for the purpose of the original paper stock. The improved method hereinafter described is efficiently operable to recover fiber of original quality and color and the novel steps and combinations thereof wherethrough the advantages are obtained may be economically employed to procure a high quality recovery.

In preparing used paper for deinking and recovery of fiber through the improved method, the stock to be salvaged is first thoroughly macerated and cleansed of superficial dirt through the agency of any suitable system or apparatus, such as is now commonly employed to the same end, whereafter the maceratum is boiled, subjected to the action of a suitable alkali, or both, to soften the paper fibers, loosen and disintegrate at least part of the ink and other matter adhering to the fibers, and thoroughly agitated, either while in the alkaline solution or subsequently, to disintegrate and defiber the stock as thoroughly as possible, whereafter the pulp is dewatered, preferably through suitable rolls, filters, or the like, thereby removing a considerable portion of the loosened ink, and subsequently washed and dewatered for removal of additional quantities of the loosened ink as many times as may be practical and expedient, all of which is established practice and in itself only a preparatory stage for the pulp to be treated by the improved method.

The pulp resulting from the treatment above summarized is fairly well disintegrated into its essential fibers, is cleansed of foreign matter other than ink and has had most of the latter removed, though enough ink not removable by washing still adheres to the fibers to darken the color of the pulp and render it unsuitable for the manufacture of any but the cheaper and rougher kinds of paper. Giving practical effect to the novelty of my improved method, the pulp resulting from the foregoing treatment is mixed with fresh water and introduced into a suitable disintegrating apparatus of rod mill type, which apparatus is characterized by yieldable rubbing surfaces against which the pulp is pressure-rubbed, pressed and agitated, and may be given practical form in a rod mill wherein the rods and even the interior surfaces of the shell or drum are rubber covered. The action had on the pulp fibers in a mill of the character just described differs from that possible in a mill wherein the contacting surfaces are rigid and hard in that the yieldable surfaces flex and bend the fibers while s'multaneously subjecting said fibers to a wiping and rubbing action, which combined action partakes very closely of the nature of a manually performed erasing action had with conventional rubber erasers and thoroughly and completely separates the fibers, one from the other, and completely breaks down the physical bond uniting fibers and ink particles, entirely detaching the ink particles, in the case of a great many paper stocks, from the fibers for subsequent separation. This mechanical action appears to be an essential supplement to the alkaline treatment, agitation and washing where complete deinking of the pulp is to be had.

The pulp may be again dewatered and washed, if desired, for further removal of ink particles after leaving the mill above described, or it may pass directly to the next stage of the improved method, which comprises froth flotation in a conventional flotation cell or machine to finally and completely separate all remaining ink particles from the pulp fibers. It has been definitely established that the ink particles are susceptible of froth flotation in a conventional apparatus, the specific technique to be employed with a given pulp for maximum separation of the ink particles varying somewhat with the nature of the pulp. With certain pulps, it appears that it may be possible to float the ink away from the fibers without the addition of flotative reagents, certainly to some extent in the presence of only a frothing reagent, the alkali used to soften and loosen the ink acting in certain instances in the flotation cell as collector or frother, or both; with other pulps the desired separation can best be had through the use of a suitable flotative reagent from the fatty acid group or one of the derivatives thereof, oleic acid, sodium oleate, and certain of the soaps having been successfully employed to the desired end. The reagents to be employed for the froth flotation may be added to the pulp in the disintegrating mill, in which case the product of such mill may or may not be washed prior to introduction into the flotation cell, or such reagents may be added at the cell, as may appear most expedient in a given instance.

After the ink particles have been floated away in the froth from the flotation cell, the cleansed pulp is removed, dewatered and washed, if desired, and subjected to the final stage of the improved method, which comprises treatment of the pulp with a relatively minute quantity of hydrochloric acid. This treatment may be accomplished by direct addition of the HCl to the pulp solution as it comes from the flotation cell, through suitable agitation, or the pulp may be dewatered and then passed through a solution of the HCl of the desired strength. The amount of acid to be employed in this final treatment will vary with different pulps, and with some pulps may not be required at all, but in no instance should the amount of acid exceed two pounds to the ton of pulp and in many instances one-fourth or less of a pound of acid to the ton of pulp will be found adequate. When the proper amount of HCl is used, the pulp is brightened, clarified and improved as to color, and the resultant fiber, washed and dewatered if desired, is clear, bright, and restored to substantially its original color, and is then ready for admixture with sulphite stock and the other desired ingredients for paper manufacture, in exactly the same manner as would be employed with the original, unused pulp.

Since the improved method is susceptible of almost infinite variation in respect of specific detail, and must of necessity vary in respect of the specific nature and quantity of reagents to be employed for best effect with different specific paper pulps, I wish to be understood as being limited solely by the scope of the appended claims, rather than by any details of the foregoing exposition.

I claim as my invention—

1. That method of salvaging used paper fiber for reuse in paper manufacture which comprises subjecting used paper stock to maceration, alkali treatment and agitation, partial dewatering of the maceratum, subsequent mechanical rubbing of the resultant pulp between yieldable surfaces and froth flotative separation of impurities from the product of said mechanical rubbing.

2. That method of salvaging used paper fiber for reuse in paper manufacture which comprises subjecting used paper stock to maceration, alkali treatment and agitation, partial dewatering of the maceratum, subsequent mechanical rubbing of the resultant pulp between yieldable surfaces to free ink particles from pulp fiber and separation by means of froth flotation of ink particles from the product of said mechanical rubbing.

3. That method of salvaging used paper fiber for reuse in paper manufacture which comprises subjecting used paper stock to maceration, alkali treatment and agitation, partial dewatering of the maceratum, mechanical disintegration of the resultant pulp, froth flotative separation of impurities from the product of said mechanical disintegration, and treatment of the cleansed pulp with highly dilute hydrochloric acid.

4. That method of salvaging used paper fiber for reuse in paper manufacture which comprises subjecting used paper stock to maceration, alkali treatment and agitation, partial dewatering of the maceratum, mechanical disintegration of the resultant pulp between yieldable surfaces, froth flotative separation of impurities from the product of said mechanical disintegration, and treatment of the cleansed pulp with highly dilute hydrochloric acid.

5. That method of deinking used paper stock which includes rubbing of the stock in disintegrated pulp form between rubber-covered rods for detachment of ink particles from pulp fibers, and subsequent agitation of the rubbed pulp in a froth flotation cell for flotative separation of the detached ink particles from the stock fibers.

6. That method of deinking used paper stock which includes mechanical rubbing of the stock in pulp form between rubber-covered rods for thorough loosening of ink particles from pulp fibers thereof and subsequent agitation of the rubbed pulp in a froth flotation cell for flotative separation of the loosened ink particles from the stock fibers.

7. That method of deinking used paper stock which includes mechanical rubbing of the stock in pulp form between yieldable surfaces for thorough detachment of the stock fibers from adhering ink particles and from each other, subsequent agitation of the rubbed pulp in a froth flotation cell for flotative separation of ink particles from the stock fibers, and treatment of the cleansed fibers with highly dilute hydrochloric acid.

8. The method of salvaging used paper stock for reuse in paper manufacture which comprises subjecting the stock to maceration, alkaline treatment and thorough agitation to pulp the stock, partial dewatering of the pulp, and agitation of the pulp with a fatty acid for separation of the ink particles and fibers in a froth flotation cell.

9. The method of salvaging used paper stock for reuse in paper manufacture which comprises subjecting the stock to maceration, alkaline treatment and thorough agitation to pulp the stock, partial dewatering of the pulp, subsequent mechanical rubbing of the pulp between rubber-covered rods for detachment of ink particles from pulp fibers, and agitation of the rubbed pulp with a fatty acid for separation of the ink particles and fibers in a froth flotation cell.

10. The method of salvaging used paper stock for reuse in paper manufacture which comprises subjecting the stock to maceration, alkaline treatment and thorough agitation to pulp the stock, partial dewatering of the pulp, subsequent mechanical rubbing of the pulp between rubber-covered rods for detachment of ink particles from pulp fibers, and agitation of the rubbed pulp with a derivative of a fatty acid for separation of the ink particles and fibers in a froth flotation cell.

11. The method of salvaging used paper stock for reuse in paper manufacture which comprises subjecting of the stock to an alkaline treatment, washing of the alkali treated stock, and subsequent agitation of the resultant pulp in a froth flotation cell with a fatty acid for froth flotative separation of the ink particles and stock fibers.

THEODORE EARLE.